US 9,542,074 B2

(12) United States Patent
Mauro

(10) Patent No.: US 9,542,074 B2
(45) Date of Patent: Jan. 10, 2017

(54) METHOD AND APPARATUS FOR ENHANCING AN INTERACTIVE VOICE RESPONSE (IVR) SYSTEM

(75) Inventor: David Andrew Mauro, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 609 days.

(21) Appl. No.: 13/416,245

(22) Filed: Mar. 9, 2012

(65) Prior Publication Data

US 2013/0094633 A1    Apr. 18, 2013

Related U.S. Application Data

(60) Provisional application No. 61/546,940, filed on Oct. 13, 2011.

(51) Int. Cl.
| | | |
|---|---|---|
| *H04M 1/64* | (2006.01) | |
| *G06F 3/0482* | (2013.01) | |
| *H04M 3/51* | (2006.01) | |
| *H04M 7/00* | (2006.01) | |
| *H04M 1/725* | (2006.01) | |

(52) U.S. Cl.
CPC .......... *G06F 3/0482* (2013.01); *H04M 3/5166* (2013.01); *H04M 7/0039* (2013.01); *H04M 1/72519* (2013.01); *H04M 2250/56* (2013.01)

(58) Field of Classification Search
CPC ................................................ H04M 3/5166
USPC .......................................................... 378/88
See application file for complete search history.

(56) References Cited

U.S. PATENT DOCUMENTS

| | | | | |
|---|---|---|---|---|
| 6,016,336 A | * | 1/2000 | Hanson ...................... | 379/88.23 |
| 6,370,238 B1 | * | 4/2002 | Sansone et al. ........... | 379/88.23 |
| 6,456,619 B1 | * | 9/2002 | Sassin et al. ................. | 370/356 |
| 6,487,277 B2 | * | 11/2002 | Beyda et al. .............. | 379/88.01 |
| 6,885,733 B2 | * | 4/2005 | Pearson et al. ................. | 379/76 |
| 6,922,466 B1 | * | 7/2005 | Peterson et al. ........... | 379/88.09 |
| 7,065,188 B1 | * | 6/2006 | Mei ......................... | G10L 15/22 |
| | | | | 379/76 |
| 7,602,888 B2 | * | 10/2009 | Vu ....................... | H04M 3/4936 |
| | | | | 379/88.14 |
| 7,773,731 B2 | * | 8/2010 | Malik ................... | H04M 3/493 |
| | | | | 379/88.05 |

* cited by examiner

*Primary Examiner* — Joseph T Phan
(74) *Attorney, Agent, or Firm* — Hamilton, Brook, Smith & Reynolds, P.C.

(57) ABSTRACT

Current interactive voice response (IVR) systems only allow customers to interact with a company's database using a telephone keypad or by speech recognition. Such IVR systems require a customer to listen to and remember instructions or options presented by the IVR system. The instructions may be complicated, or there may be many options. An embodiment of the present invention enhances an IVR system by composing visual representations of states of the IVR system to display to the customer and enabling the customer to interact with the IVR via the visual representations. The use of the visual representations enables a user to interact with the IVR in a simplified and more expedient manner in part because a linear set of options is presented in a randomly-accessible list or tree structure format.

27 Claims, 9 Drawing Sheets

METHOD AND APPARATUS FOR ENHANCING AN INTERACTIVE VOICE RESPONSE (IVR) SYSTEM

RELATED APPLICATION

This application claims the benefit of U.S. Provisional Application No. 61/546,940, filed on Oct. 13, 2011.

The entire teachings of the above application are incorporated herein by reference.

BACKGROUND OF THE INVENTION

Interactive voice response (IVR) is a technology that allows a computer or machine to interact with humans through the use of voice and dual-tone multi-frequency signaling (DTMF) keypad inputs.

In telecommunications, IVR systems allow customers to interact with a company's database via a telephone keypad or by speech recognition, after which they can service their own inquiries by following an IVR dialogue. In addition, IVR systems can respond with a prerecorded or dynamically generated audio to direct users further on how to navigate through the IVR system.

IVR systems can be applied to control almost any function where transactions can be broken down into a series of simple interactions. Further, IVR systems that are deployed in a communications network are sized to handle large call volumes.

IVR systems are typically used to service high call volumes, reduce cost, and improve the customer experience. Examples of typical IVR applications are telephone banking, televoting, and credit card services. Companies also use IVR services to extend their business hours to 24/7 operation.

The use of IVR and voice automation enables a company to improve its customer service and lower its costs, due to the fact that callers' queries can be resolved without the need for queuing and incurring the cost of a live agent who, in turn, can be directed to deal with more demanding areas of the service. If the caller does not find the information needed, or requires further assistance, the call can then be transferred to an agent. This makes for a more efficient system in which agents have more time to deal with complex interactions: for example, customer retention, up-selling, cross-selling, and issue resolution. This way, the customer is more likely to be satisfied with a personalized service, and the interaction is likely to be more fulfilling and rewarding for the agent, as opposed to dealing with basic inquiries that require yes/no responses, such as obtaining customer details.

Call centers use IVR systems to identify and segment callers. The ability to identify customers allows services to be tailored according to the customer profile. The caller can be given the option to wait in the queue, choose an automated service, or request a callback (at a suitable time and telephone number). The system may obtain caller line identification (CLI) data from the network to help identify or authenticate the caller. Additional caller authentication data may also include account number, personal information, password and biometrics (such as a voice print).

When an IVR system answers multiple phone numbers, the use of dial number identification service (DNIS) ensures that the correct application and language is executed. A single, large, IVR system can handle calls for thousands of applications, each with its own phone numbers and script.

Generally, two main varieties of speech recognition are used in IVR: (i) those based upon predefined grammars (used in "directed" dialogues), and (ii) those based on statistically trained language models (used in "natural language" dialogues). Directed dialogues prompt the caller with specific questions or options. Natural language dialogues employ open questions (e.g., "How can I help you?"), are more conversational, and can interpret free-form responses.

Other technologies include using Text-To-Speech (TTS) to speak complex and dynamic information, such as e-mails, news reports or weather information. TTS is computer generated synthesized speech that is no longer a robotic voice traditionally associated with computers. Real voices create the speech in fragments that are spliced together (concatenated) and smoothened before being played to the caller.

SUMMARY OF THE INVENTION

An embodiment of the present invention is a method, system, or computer readable medium, with program codes embodied thereon, for enhancing an interactive voice response (IVR) system. For ease of reading, the term "system" is used in various portions of the description and may represent some or all forms of embodiments and implementations of the present invention, such as systems, methods, apparatuses, devices, computer readable media, network nodes, and networks.

The embodiment inspects the IVR system to determine states defined therein. The states are used to represent choices available to a user to navigate the IVR system. The embodiment also composes visual representations of the states of the IVR system to display to the user and enables user interaction with the IVR system via the visual representations.

Further, the embodiment may also organize the states representing the choices into a decision tree structure and optionally present the visual representations to the user in an arrangement corresponding to the decision tree structure. The embodiment may also map the decision tree structure of the IVR system based on real-time user interaction with the IVR system.

The embodiment may update the mapping of the decision tree structure of the IVR system based navigation paths taken by the user or a plurality of users during at least one interaction with the IVR system. Alternatively, the mapping of the decision tree structure of the IVR system may be preconfigured.

The embodiment may also include synchronizing a change of states of the IVR system with a change of states of the visual representations in response to user interaction with the IVR system via the visual representations.

Further, the embodiment may synchronize a change of states of the visual representations with a change of states of the IVR system in response to user interaction with the IVR system. The embodiment may also synchronize states of a third party's interface with the states of the IVR system or visual representations. The third party's interface may optionally include at least a subset of the states of the IVR system or the visual representations.

The embodiment may also notify the user to activate visual representations of the IVR system on a user device and enable the IVR system to change states responsive to the user's interaction with the visual representations on the user device. The user device may be a wireless transmit/receive device or desktop computer, for example.

In addition, the embodiment may notify the user that the IVR system is visually enhanceable and enable an application to launch responsive to a request by the user to display the visual representations of the IVR system. The embodiment may also automatically launch the application in response to a user connecting to the IVR system.

The embodiment may store a history of transactions with the IVR system by the user and determine frequently accessed functions of the IVR system by the user based on the history of transactions with the IVR system of the user. The embodiment may also compose visual representations representing the frequently accessed functions. Further, the embodiment may display the visual representations representing the frequently accessed functions to the user. Using the visual representations, the embodiment enables the user to traverse the states of the IVR system to the frequently accessed functions more quickly than without displaying the visual representations representing the frequently accessed functions.

Additionally, the embodiment may disambiguate an ambiguous search query of the user by displaying visual representations of the states of the IVR system, where the visual representation of the states includes information relating to the states of the IVR system. The information is used to enable the user to recognize a matching state of the IVR system to the ambiguous search query.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Current interactive voice response (IVR) systems only allow customers to interact with a company's database using a telephone keypad or by speech recognition. Such IVR systems require a customer to listen to instructions presented by the IVR system and, in some cases, recall a menu of options presented to the customer via a voice recording before allowing the customer to interact with the IVR. However, the instructions may be complicated, or the menu of options may include many options, making it difficult for the customer to recall every option easily.

Example embodiments of the present invention include methods, systems, and computer readable media, with program codes embodied thereon, for enhancing an interactive voice response (IVR) system. For example, embodiments of the present invention enhance an IVR system by composing visual representations of states of the IVR system to display to the customer and enabling the customer to interact with the IVR via the visual representations, optionally in a selectable manner. The use of the visual representations enables a user to interact with the IVR without having to remember vast amounts of information.

Figure 1:
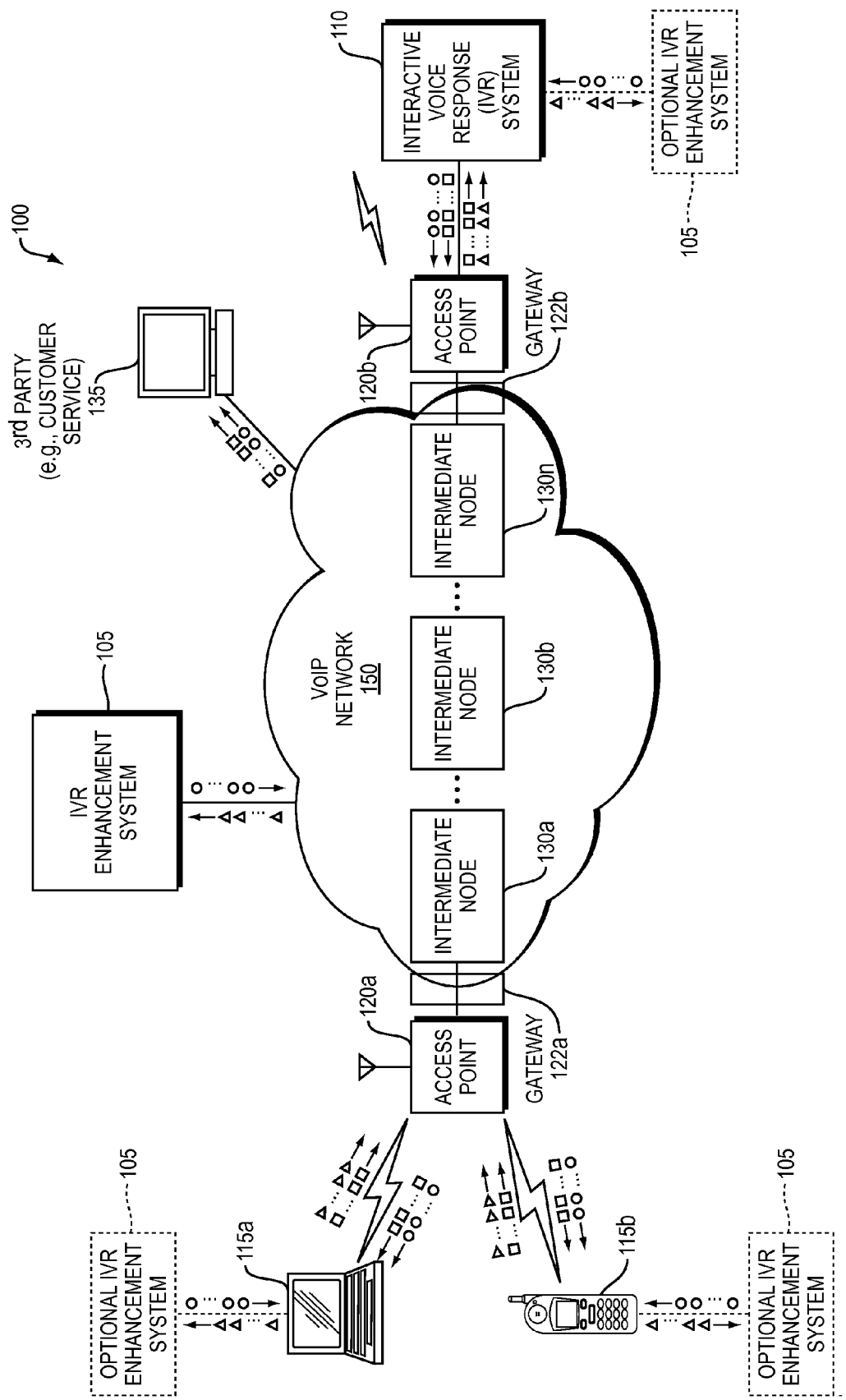
FIG. 1 is a network diagram illustrating an interactive voice response (IVR) enhancement system, used to enhance communications with an IVR system, operating in a Voice Over Internet Protocol (VoIP) network in accordance with an example embodiment of the present invention.

FIG. 1 is a high-level block diagram of a communications network 100 that may implement the present invention. The communications network 100 includes a collection of communications links interconnecting a plurality of nodes, such as communications units 115a-b, access points 120a-b, intermediate nodes 130a-n, IVR enhancement system 105, and IVR system 110, to form an internetwork of nodes. These internetworked nodes communicate by exchanging data packets according to a pre-defined set of network protocols, such as the Transmission Control Protocol/Internet Protocol (TCP/IP) and the Session Initiation Protocol (SIP). A network protocol as used herein is a formal set of rules that define how data is exchanged between nodes in a communications network.

As will be described in more detail below, the IVR enhancement system 105 may be employed to improve, customize, or otherwise modify a user's experience with the IVR system 110. Before describing the IVR enhancement system 105 in more detail, a description of the communications network is provided. It should be understood that the IVR enhancement system 105 may be employed in other network topologies or other applications, such as single processor machines.

The intermediate nodes 130a-n are typically conventional intermediate nodes, such as routers, that are configured to implement a Voice Over Internet Protocol (VoIP) network 150. The access points 120a-b contain logic that enable the communications units 115a-b to transfer information (e.g., data) between the VoIP network 150, communications units 115a-b, and IVR system 110. To that end, the access points 120a-b include circuitry configured to transmit and receive signals (e.g., radio frequency (RF) signals) that carry the information between the access points 120a-b, communications units 115a-b, and IVR system 110 via wireless links. Examples of access points 120a-b that may be used with the present invention include certain Institute of Electrical and Electronic Engineers (IEEE) 802.11 compliant access points as well as certain cellular telephone wireless systems that support the transfer of traffic (e.g., data traffic). Other forms of access points now known or hereafter developed are contemplated to be operable with embodiments of the present invention.

Communications units 115a-b may be conventional communication units, such as laptop computers, desktop computers, wireless transmit/receive units (WTRUs) (e.g., wireless telephones and personal digital assistants (PDAs)), IP telephones, and the like, that enable audible and/or visual communications to be converted into signals that are transferred to the access points 120a-b via wireless links. The access points 120a-b interface the communications units 115a-b and IVR system 110 with the network 100 and enable signals to be transferred between the communications units 115a-b, IVR system 110, and the network 100. Specifically, the access points 120a-b convert signals received from the communications units 115a-b and IVR system 110 via wireless links into data packets that are transferred onto the network 100, as well as convert packets received from the network into signals that are transferred to the communications units 115a-b and IVR system 110. Information (e.g., data, voice, or video) is typically conveyed between the communications units 115a-b and IVR system 110. It should be noted that embodiments of the present invention may be adapted to work with fixed as well as mobile devices that are able to communicate via a communications network. These fixed devices may include telephone units, personal computers, and the like that are wired to a network.

The IVR system 110 employs a telephony interface (not shown) which allows users of the communications units 115a-b to interact with a database (not shown) (e.g., a customer service provider database) to acquire information from or enter data into the database via a telephone keypad or by speech recognition. For example, banks and credit card companies use IVR systems so that their customers can receive up-to-date account information instantly and easily without having to speak directly to a person.

As illustrated, an IVR enhancement system 105 may be located at an intermediate point of the communications network 100 between communication units 115a-b and IVR system 110. Optionally, the IVR enhancement system 105 may be logically or physically coupled to the communications units 115a-b or IVR system 110. The IVR enhancement system 105 may acquire knowledge of the existence of IVR system 100 by active searching or passive learning.

For example, the IVR enhancement system 105 may search for IVR systems actively by issuing discovery messages through the VoIP network 150 that elicit a specific response unique to an IVR system. Alternatively, the IVR enhancement system 105 may passively learn about IVR systems by monitoring communications messages over the VoIP network 150 to determine whether a communications session is being established with an IVR system 110, thereby enabling the IVR enhancement system 105 to discover the IVR system 110. In another embodiment, the IVR system 110 may be discovered by the IVR enhancement system 105 via a notification message from communications units 115a-b, IVR system 110, or a $3^{rd}$ Party 135.

The IVR enhancement system 105 may then inspect the discovered IVR system 110 to determine states defined therein. Each state of the IVR system 110 may represent choices available to a user to navigate the IVR system. For each state of the IVR system 110, the IVR enhancement system 105 composes visual representations of the states of the IVR system 110 to display to the user.

In addition or alternatively, the IVR enhancement system 105 enables user interaction with the IVR system 110 via the visual representations by displaying the visual representations on a graphical user interface of the communications units 115a-b and triggering a change of state of the IVR system 110 upon user interaction with a visual representation. User interaction with the visual representation may include touching a visual representation via a touch screen, clicking a visual representation via a cursor, or selecting a visual representation via a voice command. The IVR enhancement system 105 may trigger a change of state in the IVR system 110 by issuing a generated voice command to the IVR system 110 or a dual-tone multi-frequency signaling (DTMF) keypad input, thereby replacing any additional action required by the user save the user's interaction with the visual representations.

Because each state of the IVR system may transition to a different state depending on input received by a user, the IVR enhancement system 105 may organize the states of the IVR system 110 representing choices into a decision tree structure. In addition, the IVR enhancement system 105 may optionally present the visual representations to the user in an arrangement corresponding to the decision tree. This allows a user to view how an input into the IVR system 110 may direct the user down a navigation path of the IVR system 110.

For example, each visual representation of a state of the IVR system 110 represents a choice a user may select, thereby causing a change in state of the IVR system 110. The IVR enhancement system 105 enables a user to interact with each visual representation by selecting the visual representation via the user interaction methods, as described above. Thus, the IVR enhancement system 105 synchronizes the display of visual representations to a user of a communications unit 115a-b with changes of state of the IVR system. The IVR enhancement system 105 may accomplish this by using the decision tree structure. For instance, each node of the decision tree structure may be mapped to a state of the IVR system 110 and respective visual representations.

An example embodiment provides synchronization between the states of the visual representation and the states of the IVR system 110. For instance, upon user selection of a visual representation, the IVR enhancement system 105 receives control data from communications units 115a-b signaling the selection. In turn, the IVR enhancement system 105 sends communications data to the IVR system 110 representing the user's input, which causes a change in state of the IVR system 110. Contemporaneously, the IVR enhancement system 105 sends a communications signal to the communications device 115a-b, causing the visual representations to be updated/refreshed according to the new state of the IVR system 110. The IVR enhancement system 105 is able to determine the new state and visual representations to present to the user via communications units 115a-b based on the mapping of the decision tree structure to the IVR system 110 and respective visual representations. In addition, the IVR enhancement system 105 is able to refresh/update the displayed visual representations due to changes of state initiated by the IVR system 110 via the mapping.

In another embodiment, the IVR enhancement system 105 may synchronize change of states of an interface of a third party 135 with states of the IVR system 110 or visual representation of the IVR system on a user device. For example, a customer service representative may be in communication with or monitoring a user's interaction with the IVR system 110. In order to assist a user of a communications device 115a-b to better communicate with IVR system 110, it would be helpful for the third party (e.g., customer service representative) to view, via a visual display, optionally in real-time, a user's interaction with the IVR system 110 using the IVR enhancement system 105.

In some scenarios, a user of a communications device 115a-b may not have knowledge that an IVR system 110 has been (or can be) enhanced by the IVR enhancement system 105. In such a scenario, the IVR enhancement system 105 may monitor the communications network 100 for communication messages that indicate a request for a communications session with an IVR system 110. The IVR system 105 may then notify the user that the IVR system 110 is enhanced (or enhanceable) and enable the user to launch an application to display the visual representations of the states of the IVR system, thereby enabling the user to interact with the visual representations.

In another embodiment, the IVR enhancement system 105 may monitor a user's communications session with an IVR system 100. In addition, the IVR enhancement system 105 may store a history of the user's transactions with the IVR system 110 and determine frequently accessed functions of the IVR system of the user based on the user's history of transactions with the IVR system 110. Further, the IVR enhancement system 105 may compose visual representations representing the frequently accessed functions to enable the user to traverse the states of the IVR system to a state representing the frequently accessed functions more quickly than without displaying the visual representations representing the frequently accessed functions. In addition, the frequently accessed functions may also enable a user to traverse the decision tree structure of the IVR system to the frequently accessed functions.

The visual representations may be displayed to the user via an IVR enhancement application (not shown) that is configured to communicate with the IVR enhancement system 105 and IVR system 110. In addition, the application may be configured to enable the user to interact with the visual representations as described above.

Figure 2A:
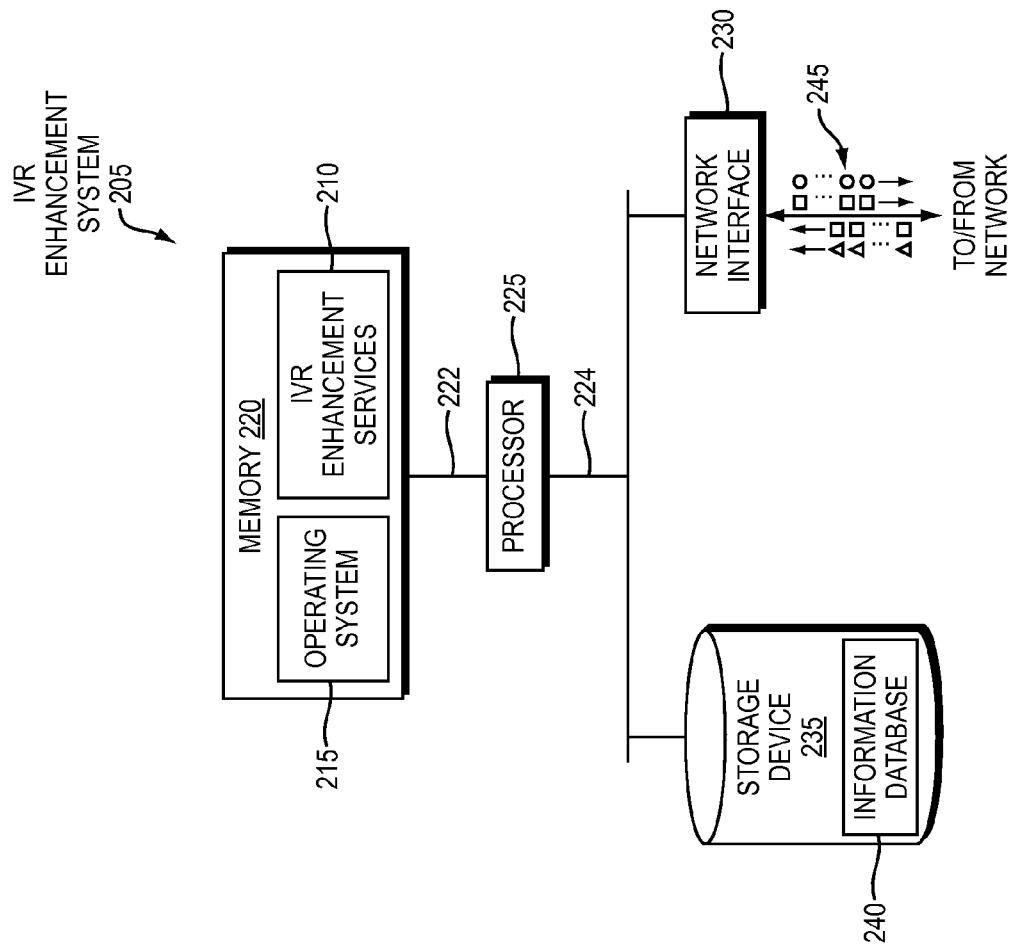
FIG. 2A is block diagram of an IVR enhancement system in accordance with an example embodiment of the present invention.

FIG. 2A is block diagram of an IVR enhancement system 205 that may be used in connection with an embodiment of the present invention. IVR enhancement system 205 includes a memory 220 coupled to a processor 225 via a memory bus 222, and a storage device 235 and a network interface 230 coupled to the processor 225 via an input/output (I/O) bus 224. It should be noted that IVR enhancement system 205 may include other devices, such as keyboards, display units and the like. The network interface 230 interfaces the IVR enhancement system 205 with the network 100 (see FIG. 1) and enables data (e.g., packets to be transferred between the IVR enhancement server 205 and other nodes, such as communications units 115a-b and IVR system 110) in the network 100. To that end, the network interface 230 may include conventional circuitry that incorporates signal, electrical and mechanical characteristics, and interchange circuits to interface with the physical media of the network 100 and protocols running over that media. The storage device 235 is a conventional storage device (e.g., a disk) capable of storing, inter alia, states of an IVR system, decision tree structures of the states, visual representations of the states, mappings of the decision tree structure to the visual representations and states of the IVR system, and IVR systems that have been enhanced.

The memory 220 is an example of a computer-readable medium, optionally implemented as a RAM employing RAM devices, such as DRAM devices and/or flash memory devices. The memory 220 contains various software and data structures used by the processor 225, such as software and data structures that implement aspects of the present invention. Specifically, the memory 220 may store software configured to serve as an operating system 215 or provide IVR enhancement services 210. The operating system 215 can be used to functionally organizes the IVR enhancement system 105 by invoking operations in support of software processes and services executing on the IVR enhancement system 205, such as IVR enhancement services 210. The IVR enhancement services 210, as will be described below, may include non-transitory computer-executable instructions to enhance communications with an IVR system by composing visual representations of the states of the IVR system to display to the user and enabling the user to interact with the IVR system via the visual representations.

The storage device 235 may include an information database 240, which may be implemented in the form of a data structure that is configured to hold various information used to enhance communications with an IVR system, such as states of the IVR system 110 (FIG. 1), visual representation of the states, a decision tree structure mapping the states of the IVR system to visual representations, and IVR systems that have been enhanced.

Figure 2B:
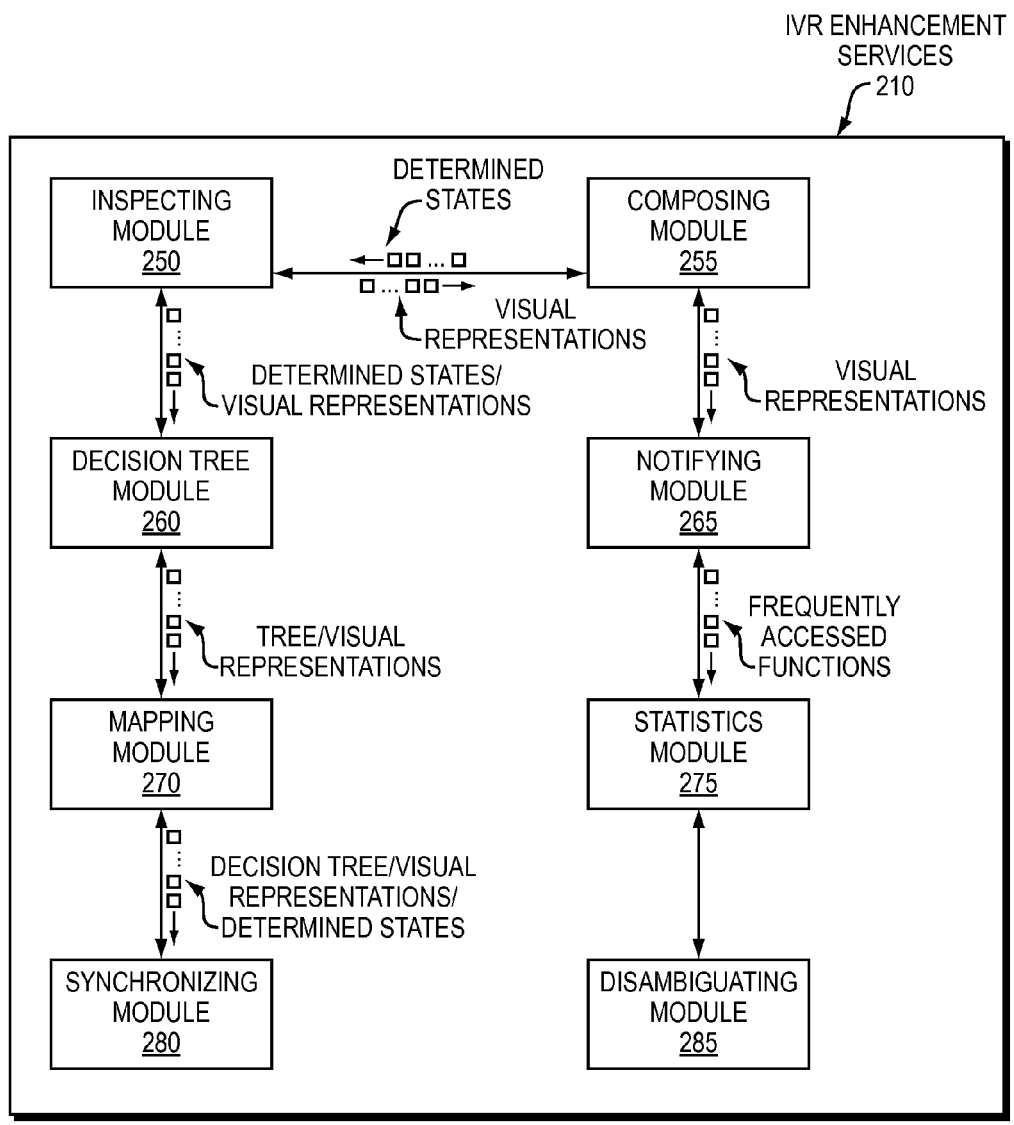
FIG. 2B is a block diagram of an IVR enhancement system module in accordance with an example embodiment of the present invention.

FIG. 2B is a block diagram of an example embodiment of an IVR enhancement services module 210 that includes an inspecting module 250, decision tree module 260, mapping module 270, synchronizing module 280, composing module 255, notifying module 265, statistics module 275, and disambiguating module 285.

The inspecting module 250 detects IVR system 110 and inspects the IVR system 110 to determine states defined therein. The inspecting module 250 informs the composing module 255 of the determined states. Based on the determined states of the IVR system 110, the composing module 255 composes visual representations of the states of the IVR system 110 to display to the user. In addition, the composing module 255 enables user interaction with the IVR system via the visual representations. For example, the composing module 255 composes visual representations of all possible input parameters for a given state of the IVR system and enables a user to transition to different states of the IVR system 110 by interacting with the visual representations.

In addition, the inspecting module 250 and composing module 255 pass the determined states of the IVR system and visual representations to the decision tree module 260. The decision tree module 260 then organizes the states of the IVR system into a decision tree structure. In addition, the decision tree module 260 maps the decision tree structure to the states of the IVR system and the visual representations, such that the synchronizing module 280 is able to synchronize displayed visual representations on communications units 115a-b with states of the IVR system.

The decision tree module 260 may map the decision tree structure of the IVR system based on real-time user interaction with the IVR system and update existing decision tree structures based on navigation paths taken by the user or a plurality of users, as described below in reference to FIG. 7.

In addition, the notifying module 265 monitors communications over VoIP network 150 (FIG. 1) to determine whether a communications session is being established with an IVR system. In response to a determination that a communications session is being established with an IVR system 110, the notifying module 265 determines whether a decision tree structure has been created for the IVR system by polling information database 240 to see if a decision tree structure has been created for a specific IVR system 110. If a decision tree exists, the notifying module 265 sends a notification message to a user of communications unit 115a-b that the IVR system 110 is enhanced and enables the communications unit 115a-b to launch an application to display visual representations of the IVR system.

The statistics module 275 monitors a user's interaction with IVR system 110 and stores the user's history of transactions with the IVR system. Based on the history of transactions with the IVR system, the statistics module 275 determines frequently accessed functions of the IVR system of the user based on the user's interaction with the IVR system 110. Further, the statistics module 275 may issue a request to the composing module 255 to compose visual representations of the frequently accessed functions. The visual representation of the frequently accessed functions are displayed to a user upon initiating a communications session with the IVR system 110, thereby enabling the user to traverse states of the IVR system to the state of the IVR system 110 representing the frequently accessed function of the IVR system 110.

In certain scenarios, a user may issue an ambiguous query that the IVR system 110 is unable to process or associate with a state of the IVR system 110. In such a scenario, the disambiguating module 285 displays visual representations of the states of the IVR system 110 that include information relating to the states of the IVR system. For example, the information enables the user to recognize a matching state of the IVR system 110 to the user's ambiguous search query. The visual representations that are chosen to be displayed may be chosen by matching key words of states of the IVR system 110 to the ambiguous search query or matching keywords parsed from the query to states of the IVR system 110.

Figure 3:
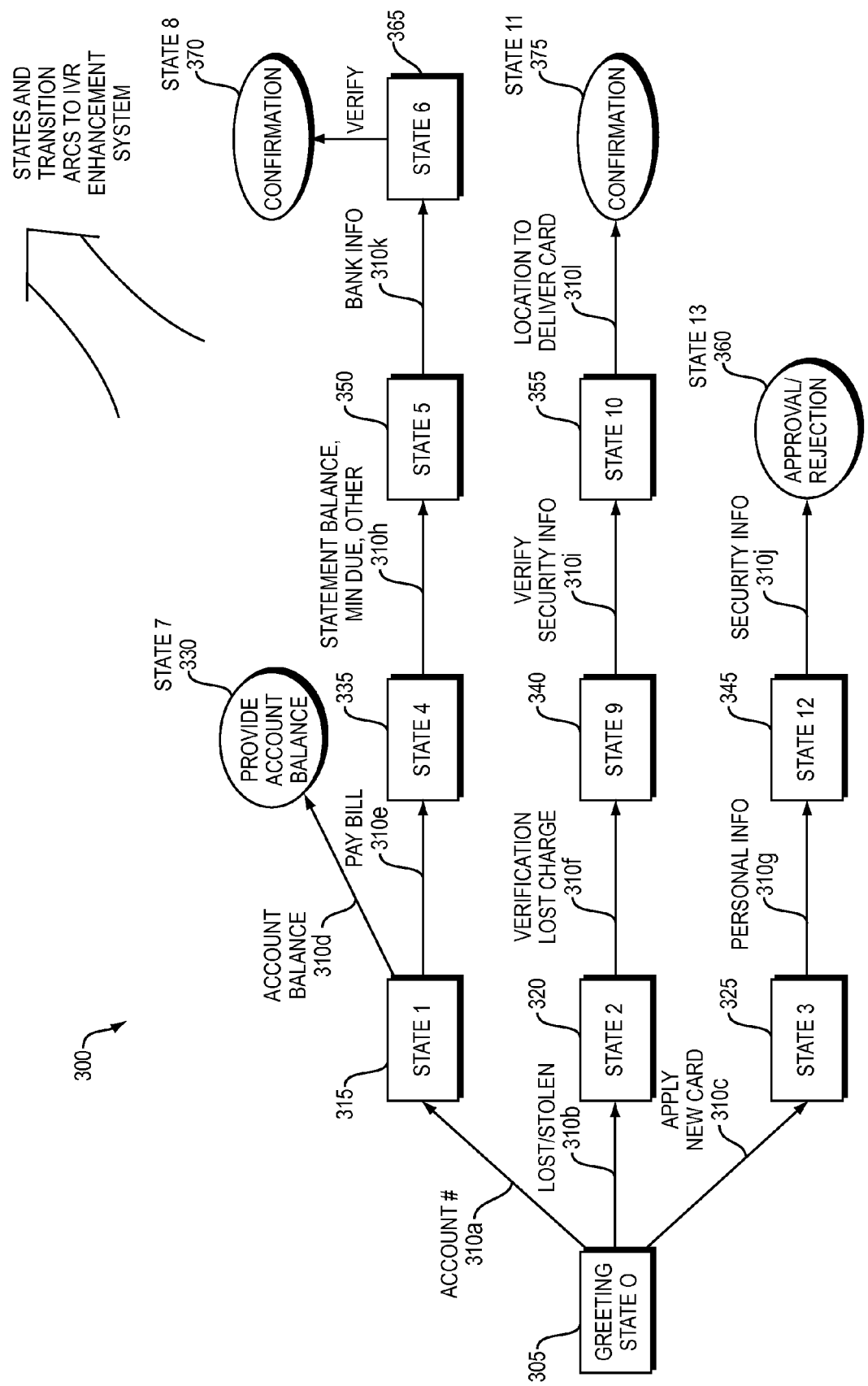
FIG. 3 is a diagram illustrating a state machine of an IVR system in accordance with an example embodiment of the present invention.

FIG. 3 is a diagram illustrating an example state machine 300 of an IVR system. As described above, the IVR enhancement system 105 inspects the IVR system to determine states defined therein. For instance, a user may call a credit card company which employs an IVR system. A user may interact with the credit card company's IVR system via voice, dual-tone multi-frequency signaling (DTMF) keypad inputs, or visual representations (as described above) of the states. Each interaction a user has with a state may cause a transition to another state.

An example state machine 300 of an IVR system for a credit card company may initiate interactions with a user during a communication session with a greeting message (state 0) 305. In this example, state 0 (305) may receive an input for the user including at least one of the following: account number 310*a*, declaration of a lost/stolen card 310*b*, or a request to apply for a new card 310*c*. State 0 (305) may then transition to state 1 (315) if an input 310*a* of an account number is received by the IVR state machine. State 1 (315) may then transition to state 7 (330) based on an input 310*d* requesting an account balance. Alternatively, state 1 (315) may transition to state 4 (335) with an input 310*c* requesting to pay a bill. State 4 (335) may accept input values 310*h* requesting to pay the statement balance, minimum due, or any other amount. Once the amount to be paid is received by state 4 (335), the state machine 300 transitions to state 5 (350), which requests and receives as input 310*k* a user's bank account information that is to be used to pay a current bill. Once state 5 (350) receives input 310*k*, state machine 300 transitions to state 6 (365) that requests the user to verify the amount the user would like to pay and the bank account information from which to pay the bill. Once state 6 (365) receives the verification information, the state machine 300 transitions to state 8 (370), which issues a confirmation to the user. The navigation path of the state machine 300 described above is just one of several navigation paths available for a user as illustrated by state machine 300.

The states and transitions are inspected by IVR enhancement system 105, which may organize the states and associated transitions into decision tree structure, which maps the states of IVR state machine 300 to visual representations of the states.

Figure 4:
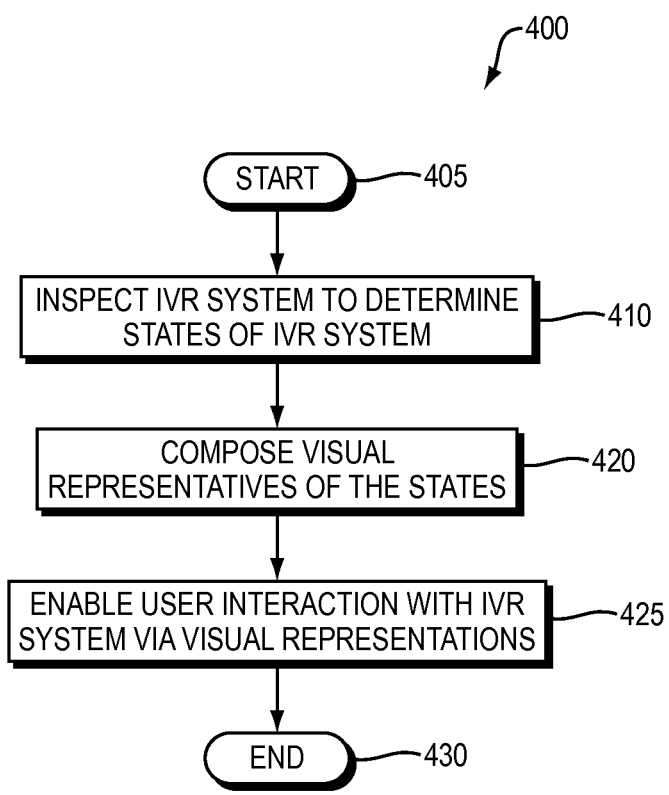
FIG. 4 is a flow diagram of an example method for enhancing an IVR system.

FIG. 4 is a flow diagram illustrating a method 400 for enhancing an interactive voice response (IVR) system. At 405, the method 400 begins. At 410, the method 400 inspects the IVR system to determine states defined therein. Each state of the IVR system represents choices available to a user to navigate the IVR system. The method 400, at 420, composes visual representations of the states of the IVR to display to the user. At 425, the method 400 enables user interaction with the IVR system via the visual representations. At 430, the method 400 ends.

Figure 5:
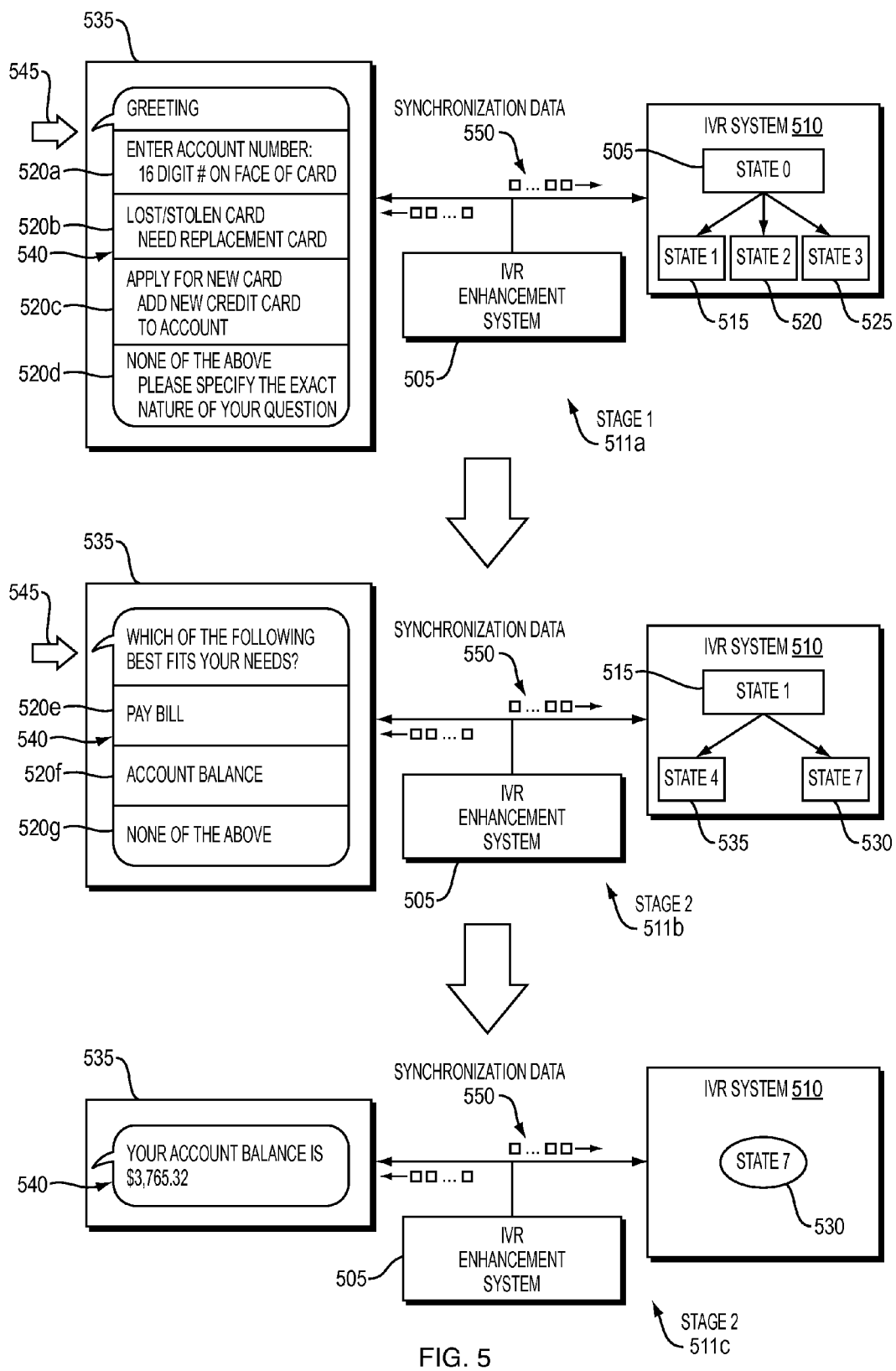
FIG. 5 is a graphical diagram illustrating the synchronization of visual representations of states displayed on a graphical user interface with states of an IVR system.

FIG. 5 is a graphical diagram illustrating the synchronization of visual representations 540 of states (505, 515, 520, 525, 530, 535) of an IVR system displayed on a graphical user interface with states of the IVR system.

Stage 1 (511*a*) illustrates a first state of communications between a communication device 535 and IVR system 510. At stage 1 (511*a*), the communications device 535 has begun communications with IVR system 510, and the IVR enhancement system 505 has provided the communications device 535 with visual representations 540 associated with state 0 (505). For example, the visual representations 540 associated with state 0 (505) include: account number input request 520*a*, lost/stolen card input 520*b*, request to apply for new card 520*c*, or an option to enter different input 520*d*. In this example, a user the user selection 545 is the account number input request 520*a*. Upon receiving this input, the communications device 535 sends synchronization data 550 to the IVR enhancement system 505, including information of the input selection 545 of the user and control data for the IVR system 510 to transition to another state based on the user selection 545.

The IVR enhancement system 505 receives the synchronization data 550 and processes the data 505. For example, the IVR enhancement system 505 forwards the control data to IVR system 510 allowing the IVR system 505 to transition to a next state (e.g., state 1 (515)) based on the user selection 545. In addition, the IVR enhancement system 505 sends the communications device 535 synchronization data 550 including visual representations associated with the next state of IVR system 510 (e.g., state 1 (515)).

The communications device 535 refreshes its display with new visual representations 540 and transitions to stage 2 (511*b*). For instance, the communications device 535 now displays the visual representations 540 associated with state 1 (515) of the IVR system 510, which include: pay bill input 520*c*, account balance request 520*f*, or option to enter different input (none of the above) 520*d*. In this example, the user selection 545 is account balance 520*f*. In response to receiving the user selection 545, synchronization data 550 is communicated between communication device 535, IVR enhancement system 505, and IVR system 510, as described above in reference to stage 1 (511*a*). The user selection 545 then causes the communications device 535 to transition to stage 3 (511*c*), where the communication device has received synchronization data 550 from the IVR enhancement system 505 and account balance information from the IVR system 510 to display the visual representations 540 associated with state 7 (530) of IVR enhancement system, which is a display of an account balance.

It should be noted the example navigation path and associated synchronization of visual representations also occurs for any other possible navigation path through states of the IVR system 510 a user may follow.

Figure 6:
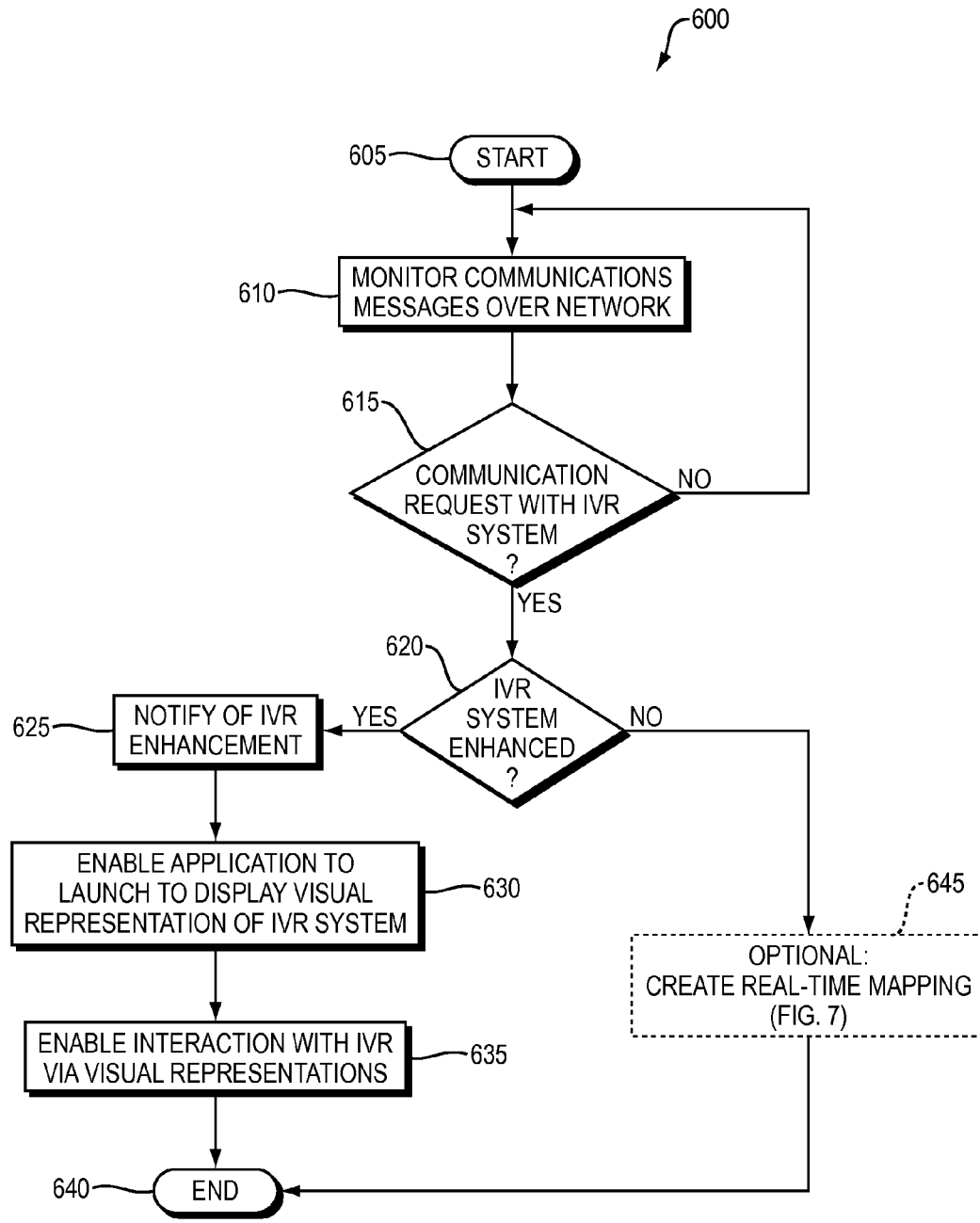
FIG. 6 is a flow diagram of an example method for notifying a user of IVR enhancement and enabling interaction with an IVR system via visual representations of states of the IVR.

FIG. 6 is a flow diagram illustrating a method 600 for notifying a customer of IVR enhancement and enabling interaction with an IVR system via visual representations of states of the IVR system. At 605, the method 600 begins. At 610, communications over a network (e.g., a VoIP Network) is monitored. At 615, it is determined whether a request to initiate a communications session with an IVR system is being made. The determination may be made by inspecting packets being transported over the network for information that signals such a communication request. For instance, packets may be inspected for a destination address known to be associated with an IVR system. Alternatively, packets may be inspected for protocol messages known to begin and establish a communications session (e.g., Session Initiation Protocol (SIP)). If, at 615, it is determined that a communications request is not being sent to an IVR system, the method 600, at 610, continues to monitor communication messages over the network.

However, if it is determined that a communications request is being made with an IVR system, the method 600, at 620, determines if the IVR system associated with the communications request is enhanced. If, at 620, it is determined that the IVR system is not enhanced, the method 600, at 645, optionally creates a real-time mapping of the IVR system (as will be described below with reference to FIG. 7). The method 600 then, at 640, ends. If it is determined that the IVR system is enhanced, the method 600, at 625, notifies the user of the IVR enhancement. The notification may be made via a visual prompt, audio signal, or message (e.g., Short Messaging Service (SMS) message or instant message). At 630, the method 600 enables an application to be launched on a user device in order to display visual representations of the IVR system. At 635, the method 600 enables interaction with the IVR via the visual representations. At 640, the method 600 ends.

Figure 7:
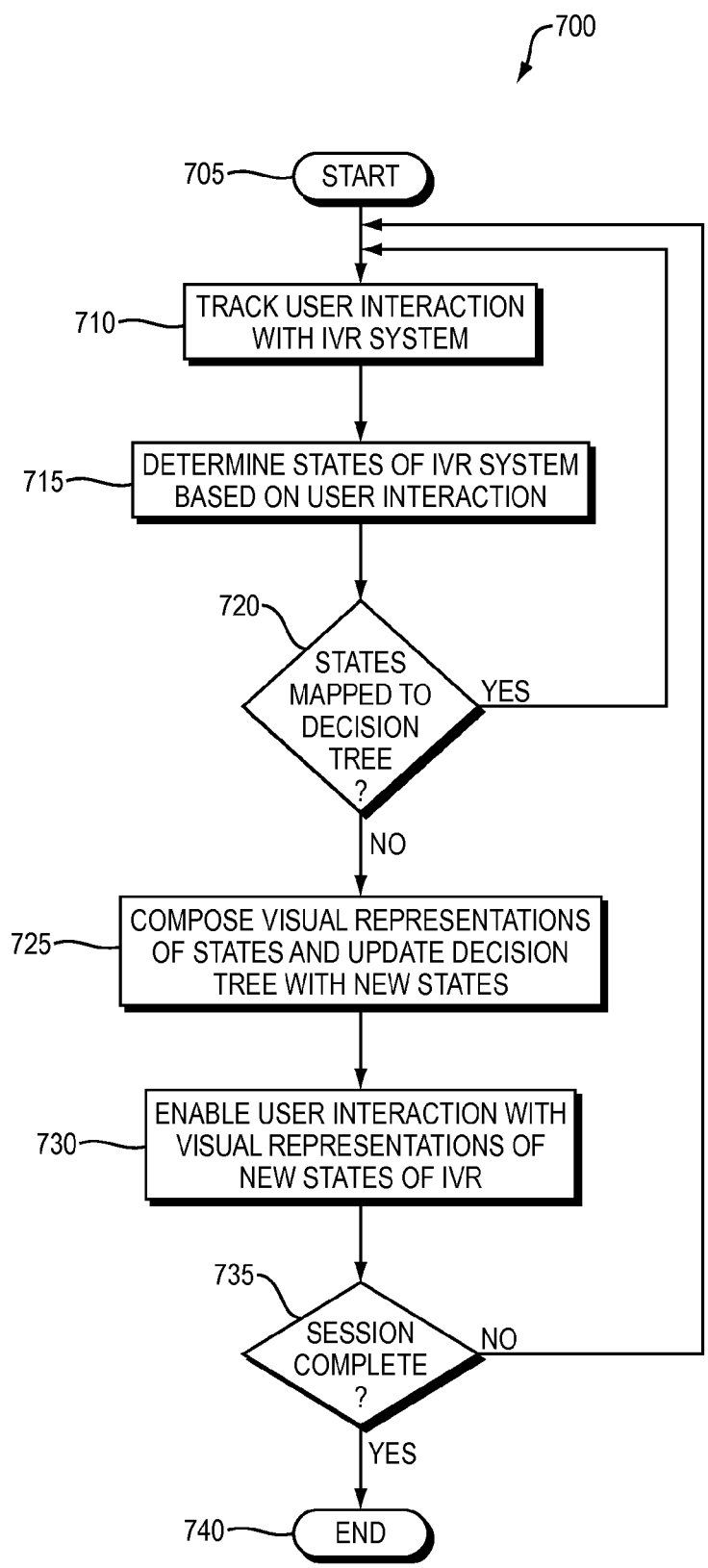
FIG. 7 is a flow diagram of an example method for determining states of an IVR system and mapping the states of a decision tree.

FIG. 7 is a flow diagram of an example method 700 for determining states of an IVR system and mapping the states of a decision tree. At 705, the method begins. At 710, the method 70 tracks user interaction with an IVR system. The method 700 may track the user interaction by monitoring messages transported between a user device and the IVR system during a communications session. At 715, the method 700 determines states of the IVR system based on the user interaction with the IVR system. For instance, the method 700 monitors state changes of the IVR system in response to input received from a user device. The method 700 then associates a state change from a current state to a new state as occurring upon receiving the input. At 720, the method 700 determines if the determined states are mapped to a decision tree structure. If the determined states are already mapped, the method 700, at 710, continues to track the user interaction with the IVR system.

If the determined states are not mapped to a decision tree structure, at 725, the method 700 composes visual representations of the states and updates a decision tree structure associated with the IVR with the determined states. At 730, the method 700 enables user interaction with the visual representations of the determined states of the IVR system. At 735, the method 700 determines if a communications session between the user and the IVR system is complete. If the communications session is not complete, the method 700, at 710, continues to track the user interaction with the IVR system. If the communications session is complete, the method 700, at 740, ends.

Figure 8:
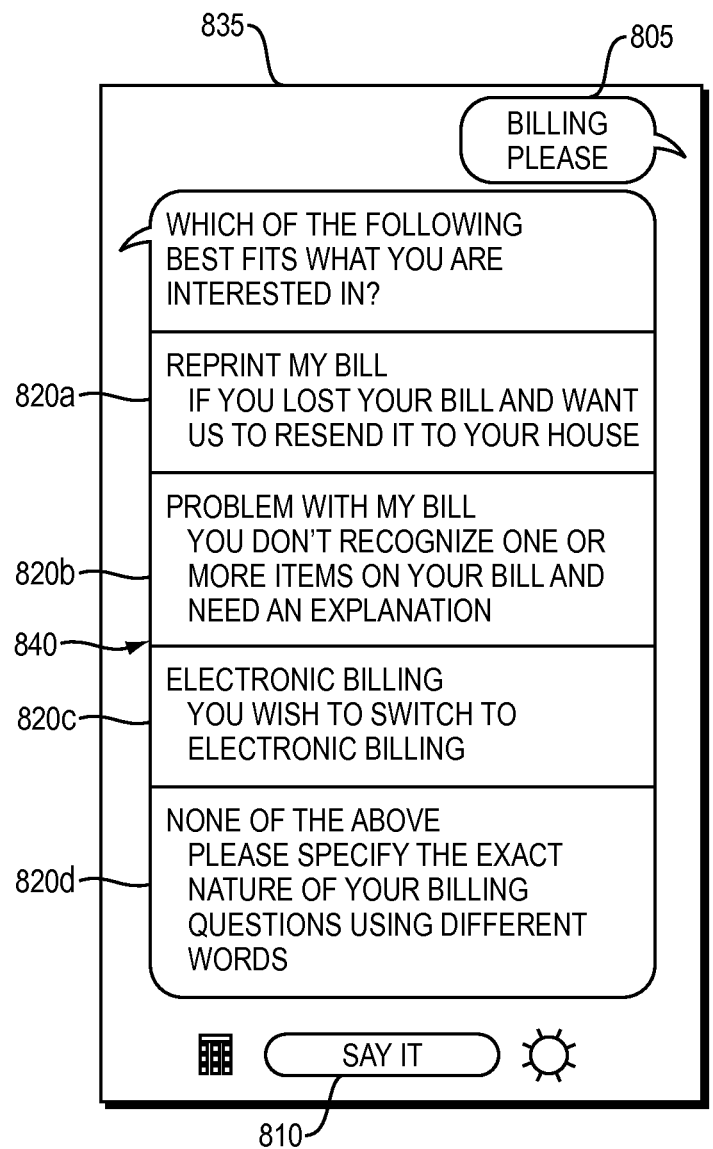
FIG. 8 is a graphical diagram illustrating disambiguation of an ambiguous query received from a user.

FIG. 8 is a graphical diagram illustrating the disambiguation of an ambiguous query received from a user. In some scenarios, an IVR system 110 may be configured with speech recognition based on statistically trained language models (used in "natural language" dialogues). Such natural language dialogues employ open questions (e.g. "How can I help you?") are more conversational and can interpret free-form responses.

For example, a communication device 835 may receive a greeting from an IVR system 110 (FIG. 1) employing such an open question. In response, a user of the communications device 835 may elect to input a vocal command by selecting a "say it" button 810 and enter an input request 805 of "Billing Please." In this scenario, the IVR system 110 is unable to process to request 805 because the term is too broad or ambiguous. For example, the user may request several different transactions under billing such as request related to: reprinting a bill, problem with a received bill, electronic billing, and paying a bill. In such a scenario, IVR enhancement system 105 is configured to disambiguate an ambiguous search query by displaying visual representations 840 of states of the IVR system 110 determined to be most related to the user's query 805. These states may be determined, for example, by parsing keywords from the query 805 and matching the keyword with keywords of states associated with IVR system 110.

In response to determining the states of the IVR system 110 to be the most related to the user's query 805, the IVR enhancement system 110 provides the communications device 835 with visual representations associated with the determined states of the IVR system 110. In addition, the IVR enhancement system 105 provides information related to each state and associated visual representations 540 of the state to display with the visual representations. For example, information 820*a-d* includes a detailed description related to each of the visual representation 840 that enable a user to recognize if one of the visual representations 840 matched the user's intended query.

It should be understood that the block diagrams and flow diagrams presented herein are merely example representations of embodiments. The block diagrams and flow diagrams may include more or fewer blocks or states, have more or fewer interconnections, and the like. Other functions known in the art may be employed and are contemplated to be within the scope of the example embodiments presented herein.

Embodiments or aspects of the invention may be implemented in hardware, firmware, or software. If implemented in software, the software may be implemented in any software language capable of performing the embodiment(s) of the invention. The software may be stored on any computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for enhancing an interactive voice response (IVR) system, the method comprising:
  by a processor:
    identifying an operative IVR system, configured to produce IVR-unique communications, by evaluating the IVR-unique communications conveyed by the IVR system as the IVR-unique communications traverse a network, from a viewpoint between the IVR system and a user of the IVR system;
    enhancing the IVR system by:
      inspecting the IVR system, through the network and from the viewpoint between the IVR system and the user of the IVR system, to determine one or more states representing choices available to a user to navigate the IVR system;
composing visual representations of the states of the IVR system to display to the user; and
enabling user interaction with the IVR system via the visual representations.

2. The method of claim 1 further comprising organizing the states representing the choices into a decision tree structure and optionally presenting the visual representations to the user in an arrangement corresponding to the decision tree structure.

3. The method of claim 2 further comprising mapping the decision tree structure of the IVR system based on real-time user interaction with the IVR system.

4. The method of claim 3 further comprising updating the mapping of the decision tree structure of the IVR system based navigation paths taken by the user or a plurality of users during at least one interaction with the IVR system.

5. The method of claim 2 wherein the mapping of the decision tree structure of the IVR system is preconfigured.

6. The method of claim 1 further comprising synchronizing a change of states of the IVR system with a change of states of the visual representations in response to user interaction with the IVR system via the visual representations.

7. The method of claim 1 wherein enabling the user interaction includes synchronizing a change of states of the visual representations with a change of states of the IVR system in response to user interaction with the IVR system.

8. The method of claim 1 further comprising synchronizing states of a third party's interface with the states of the IVR system or visual representations, the third party's interface optionally including at least a subset of the states of the IVR system or the visual representations.

9. The method of claim 1 further comprising:
notifying the user to activate visual representations of the IVR system on a user device; and
enabling the IVR system to change states responsive to the user's interaction with the visual representations on the user device.

10. The method of claim 9 wherein the user device is a wireless transmit/receive device or desktop computer.

11. The method of claim 9 wherein notifying the user includes:
notifying the user that the IVR system is visually enhanceable; and
enabling an application to launch responsive to a request by the user to display the visual representations of the IVR system.

12. The method of claim 1 further comprising:
storing a history of transactions with the IVR system by the user;
determining frequently accessed functions of the IVR system by the user based on the history of transactions with the IVR system of the user;
composing visual representations representing the frequently accessed functions; and
displaying to the user the visual representations representing the frequently accessed functions to enable the user to traverse the states of the IVR system to the frequently accessed functions more quickly than without displaying the visual representations representing the frequently accessed functions.

13. The method of claim 1 further comprising disambiguating an ambiguous search query of the user by displaying visual representations of the states of the IVR system, the visual representation of the states including information relating to the states of the IVR system, the information enabling the user to recognize a matching state of the IVR to the ambiguous search query.

14. A system for enhancing an interactive voice response (IVR) system, the system comprising:
a processor; and
a memory with computer code instructions stored thereon, the memory operatively coupled to the processor such that the computer code instructions cause the processor to implement:
an inspecting module, disposed at a viewpoint between the IVR system and a user of the IVR system, configured to (i) identify an operative IVR system set up to produce IVR-unique communications, and (ii) determine one or more states representing choices available to a user to navigate the IVR system;
a composing module configured to compose visual representations of the states of the IVR system to display to the user; and
an interface configured to enable user interaction with the IVR system via the visual representations.

15. The system of claim 14 further comprising a decision tree module configured to organize the states representing the choices into a decision tree structure and optionally present the visual representations to the user in an arrangement corresponding to the decision tree structure.

16. The system of claim 14 further comprising a synchronizing module configured to synchronize a change of states of the IVR system with a change of states of the visual representations in response to user interaction with the IVR system via the visual representations.

17. The system of claim 15 further comprising a mapping module configured to map the decision tree structure of the IVR system based on real-time user interaction with the IVR system.

18. The system of claim 17 wherein the mapping module is further configured to update the mapping of the decision tree structure of the IVR system based navigation paths taken by the user or a plurality of users during at least one interaction with the IVR system.

19. The system of claim 15 wherein the map of the decision tree structure of the IVR system is preconfigured.

20. The system of claim 14 further comprising a synchronizing module configured to synchronize a change of states of the visual representations with a change of states of the IVR system in response to user interaction with the IVR system.

21. The system of claim 14 further comprising a synchronizing module configured to synchronize a third party's interface with the states of the IVR system or visual representations, the third party's interface optionally including at least a subset of the states of the IVR system or the visual representations.

22. The system of claim 14 further comprising:
a notifying module configured to notify the user to activate visual representations of the IVR system on a user device; and
a synchronizing module configured to enable the IVR system to change states responsive to the user's interaction with the visual representations on the user device.

23. The system of claim 22 wherein the user device is a wireless transmit/receive device or desktop computer.

24. The system of claim 22 wherein the notifying module is further configured to:

notify the user that the IVR system is visually enhanceable; and enable an application to launch responsive to a request by the user to display the visual representation of the IVR system.

25. The system of claim 14 further comprising:

a data store configured to store a history of transactions with the IVR system by the user;

a statistics module configured to determine frequently accessed functions of the IVR system by the user based on the history of transactions with the IVR system of the user; and the composing module further configured to compose the visual representations representing the frequently accessed functions; and a display configured to display to the user the visual representations representing the frequently accessed functions to enable the user to traverse the states of the IVR system to the frequently accessed functions more quickly than without displaying the visual representations representing the frequently accessed functions.

26. The system of claim 14 further comprising a disambiguating module configured to disambiguate an ambiguous search query of the user by displaying visual representations of the states of the IVR system, the visual representation of the states including information relating to the states of the IVR system, the information enabling the user to recognize a matching state of the IVR to the ambiguous search query of the user.

27. A non-transitory, tangible, computer readable medium having computer readable program codes embodied therein for enhancing an interactive voice response (IVR) system, the computer readable program codes including instructions that, when executed by a processor, cause the processor to:

identify an operative IVR system configured to produce IVR-unique communications, by evaluating the IVR-unique communications conveyed by the IVR system as the IVR-unique communications traverse a network, from a viewpoint between the IVR system and a user of the IVR system;

modifying the IVR system by:

inspecting, through the network and from the viewpoint between the IVR system and a user of the IVR system, a decision tree structure of the IVR system to determine one or more states-representing choices of a user's navigation of the IVR system;

composing visual representations of the states of the IVR system to display to a user on the decision tree structure;

defining a user's navigation of the IVR system; and enabling user interaction with the IVR system via the visual representations.

* * * * *